No. 633,765. Patented Sept. 26, 1899.
J. A. LOWE.
CHECK HOOK.
(Application filed June 14, 1899.)
(No Model.)
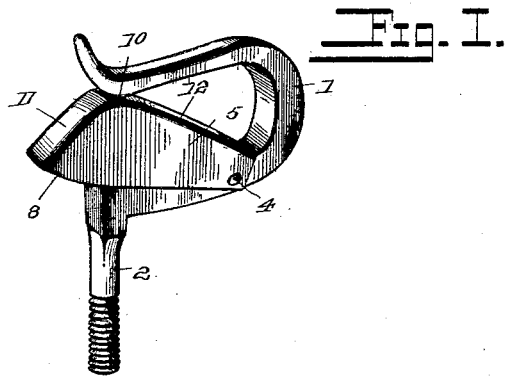
Fig. I.
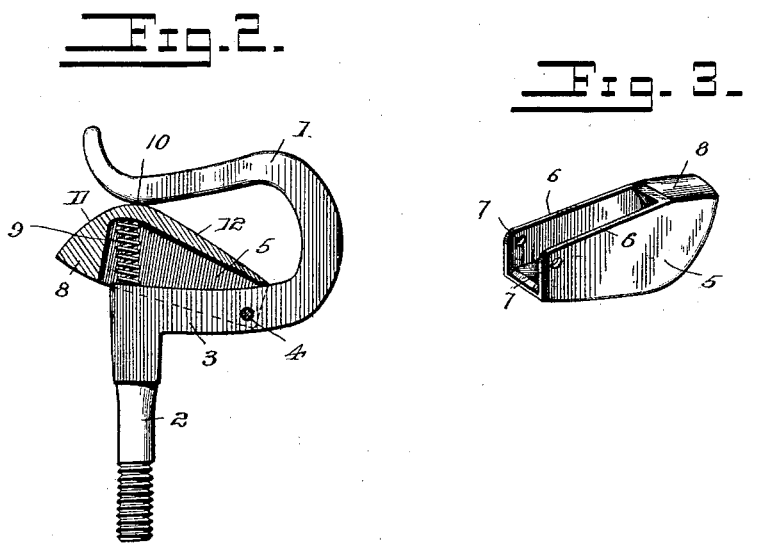
Fig. 2.
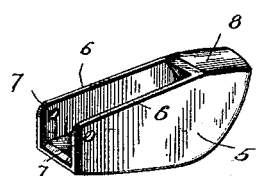
Fig. 3.
Witnesses
F. E. Alden
J. A. Lowe, Inventor.
By his Attorney
C. A. Snow & Co.
THE NORRIS PETERS CO., PHOTO-LITHO., WASHINGTON, D. C.

UNITED STATES PATENT OFFICE.

JOSEPH ALFRED LOWE, OF SAN JOSÉ, CALIFORNIA.

CHECK-HOOK.

SPECIFICATION forming part of Letters Patent No. 633,765, dated September 26, 1899.

Application filed June 14, 1899. Serial No. 720,540. (No model.)

*To all whom it may concern:*

Be it known that I, JOSEPH ALFRED LOWE, a citizen of the United States, residing at San José, in the county of Santa Clara and State of California, have invented a new and useful Check-Hook, of which the following is a specification.

This invention relates to checkrein-hooks of that class embodying a spring-actuated latch which is adapted to close the entrance opening into the loop of the hook, and has for its object to provide an improved latch which is adapted to facilitate the engagement and removal of the checkrein and to prevent accidental displacement of the latch.

A further object of the invention is to house the actuating-spring, so that the same is prevented from becoming displaced and also protected from the effects of the weather.

To these ends the present invention consists in the combination and arrangement of parts, as will be hereinafter more fully described, shown in the accompanying drawings, and particularly pointed out in the appended claim, it being understood that changes in the form, proportion, size, and the minor details of construction may be made within the scope of the appended claim without departing from the spirit or sacrificing any of the advantages of the present invention.

In the accompanying drawings, Figure 1 is a perspective view of the improved check-hook. Fig. 2 is a side elevation thereof, showing the spring-actuated latch in section. Fig. 3 is a detail perspective view of the spring-actuated latch.

Corresponding parts in the several figures of the drawings are designated by like characters of reference.

Referring to the drawings, there is shown a hook 1, comprising a shank 3, a bill above the shank, a connecting-bight for the bill and shank, and an attaching-post 2. Mounted within the inclosure of the hook and upon a suitable transverse pivot-pin 4, extending through the shank of the hook and located near the bight thereof, is the spring-actuated latch 5. This latch is provided with opposite longitudinal and pendent side flanges 6, which are straight or flat upon their lower sides and form a socket or recess extending nearly the entire length of the latch. The inner end of the socket is open, as best shown in Fig. 3 of the drawings, and at this end of the latch the opposite side flanges 6 are provided with a pair of transversely-alined openings 7, which are adapted to receive the pivot-pin 4 when the latch is mounted upon the hook. The forward end of the socket, formed by the side flanges 6, is closed by an integral wall 8, and the upper face of the latch is rounded longitudinally and adapted to normally engage the adjacent under side of the outer free end of the bill.

As best indicated in Fig. 2, it will be seen that the side flanges 6 of the latch embrace the shank of the hook, and the latch is pivoted thereto near the inner end thereof, so that the free end of the latch extends outwardly through the entrance-opening into the inclosure of the hook. It will thus be seen that the inner open end of the latch receives the shank of the hook, and as the latch is pivoted at or near the lower edges of the flanges 6 said open end permits of the vertical pivotal movement of the latch. Also the wall 8 at the outer closed end of the latch is located beyond the outer end of the shank 3 of the hook, whereby said shank is received within the socket or recess of the latch, so as to permit of the latter being pressed downward when the checkrein is being engaged with the hook.

The means for normally holding the latch in engagement with the under side of the bill of the hook comprises a coiled spring 9, which rests upon the upper face of the shank of the hook and bears against the upper side of the socket formed in the latch and near the outer free end thereof. Thus it will be seen that the spring is entirely housed by the latch and is thereby prevented from being displaced and is also protected from the effects of the weather.

The peculiar shape of the upper face of the latch renders the present invention exceedingly useful and effective, as said face is rounded at a point 10 intermediate of its ends and is inclined gradually downward in opposite directions therefrom, as indicated at 11 and 12. By reason of the longer inclined inner portion of the upper face there is provided in the inclosure of the hook ample room for the checkrein, while the outer and more abruptly inclined portion 11 provides a comparatively wide entrance between the same and the outer end of the bill.

The present invention provides an exceedingly simple and useful check-hook, as the movable latch thereof is substantially mounted and the actuating-spring is effectively protected from the effects of the weather. Furthermore, the checkrein may be engaged with and removed from the hook without manually operating the movable latch, although the outer rounded face 11 provides a convenient thumb-piece for operating the said latch, if it should become necessary.

What I claim is—

In a check-hook, the combination with the bill, and the shank thereof located one above the other, of a movable latch having pendent longitudinal flanges forming a socket, which is open at the inner end and closed at the outer end of the latch, the latter being located within the inclosure of the hook and the flanges embracing the shank thereof and pivoted thereto near the inner end thereof, the closed end of the socket, at the outer free end of the latch, being disposed beyond the end of the shank, whereby the socket receives the latter and prevents displacement of the latch, the upper face of the latter being beveled or inclined downwardly in opposite directions, and the point of intersection of the inclined faces being rounded and bearing against the under side of the bill, and a spring housed within the socket of the latch, and bearing in opposite directions against the shank and the upper wall of the socket, substantially as shown and described.

In testimony that I claim the foregoing as my own I have hereto affixed my signature in the presence of two witnesses.

JOSEPH ALFRED LOWE.

Witnesses:
  E. S. JOHNSTON,
  R. COTTLE.